(12) United States Patent
Koenen et al.

(10) Patent No.: US 6,369,532 B2
(45) Date of Patent: Apr. 9, 2002

(54) CONTROL SYSTEM FOR AN ELECTRIC MOTOR HAVING AN INTEGRAL FLYWHEEL ROTOR

(75) Inventors: Robert Koenen; Scott Wesenberg, both of Hartland, WI (US)

(73) Assignee: Briggs & Stratton Corporation, Milwaukee, WI (US)

( * ) Notice: Subject to any disclaimer, the term of this patent is extended or adjusted under 35 U.S.C. 154(b) by 0 days.

(21) Appl. No.: 09/773,410

(22) Filed: Feb. 1, 2001

Related U.S. Application Data (60) Provisional application No. 60/184,525, filed on Feb. 24, 2000.

(51) Int. Cl.$^7$ ................................. H02P 5/20
(52) U.S. Cl. ................ 318/150; 318/161; 310/74; 310/153; 290/27; 290/28; 290/48; 290/40 A; 180/165; 180/65.2; 180/65.3
(58) Field of Search ................. 318/150, 161; 180/165, 65.2, 65.3; 310/74, 153; 290/27, 28, 48, 40 A (56) References Cited

U.S. PATENT DOCUMENTS

| | | |
|---|---|---|
| 3,591,844 A | 7/1971 | Schonebeck et al. |
| 3,908,130 A | 9/1975 | Lafuze |
| 3,958,174 A | 5/1976 | Studtmann et al. |
| 4,035,712 A | 7/1977 | Yarrow et al. |
| 4,038,758 A | 8/1977 | Miller |
| 4,219,739 A | 8/1980 | Greenwell |
| 4,246,531 A | 1/1981 | Jordan |
| 4,306,402 A | 12/1981 | Whimp |
| 4,401,938 A | 8/1983 | Cronin |
| 4,405,031 A * | 9/1983 | Rotter ........................ 180/165 |
| 4,426,585 A * | 1/1984 | Bigalke .................... 290/38 B |
| 4,458,156 A * | 7/1984 | Maucher et al. .......... 290/38 B |
| 4,459,536 A | 7/1984 | Wirtz |
| 4,589,249 A | 5/1986 | Walker et al. |
| 4,597,203 A | 7/1986 | Middleton |
| 4,625,160 A | 11/1986 | Hucker |
| 4,626,696 A * | 12/1986 | Maucher et al. .......... 290/38 R |
| 4,631,456 A | 12/1986 | Drescher et al. |
| 4,720,638 A | 1/1988 | Vollbrecht |

(List continued on next page.)

FOREIGN PATENT DOCUMENTS

| | | |
|---|---|---|
| EP | 0 903 832 A1 | 3/1999 |
| EP | 0 904 971 A1 | 3/1999 |
| EP | 0 913 290 A1 | 5/1999 |
| WO | WO 97/41629 | 11/1997 |

OTHER PUBLICATIONS

Patent Application Entitled Stator For An Electric Motor/Generator With A Half–Integer Winding, Serial No. 09/774,649, Attorney Docket No. 18367/9560.

*Primary Examiner*—Jeffrey Donels
*Assistant Examiner*—Rina I. Duda
(74) *Attorney, Agent, or Firm*—Michael Best & Friedrich LLP (57) ABSTRACT

A control system for an electric motor having an integral flywheel rotor. The motor includes a stator mounted co-axially with the engine crankshaft and a rotor surrounding the stator. A sensor is positioned near the rotor for sensing its rotational speed. The sensor is coupled to a controller. The controller is operable to deliver an output signal to the stator to start the internal combustion engine. While the engine is starting, the processor steps the starter motor from a low speed to a high speed. Once the engine has started and is rotating at a speed greater than a trigger speed, the processor delivers another output signal such that the motor is commutated at a speed that is less than the speed of the rotor to generate a speed slip. By commutating the motor in this manner, it acts as a generator. The speed slip is regulated when the motor is generating electric power so that the motor produces a constant output voltage.

31 Claims, 8 Drawing Sheets

U.S. PATENT DOCUMENTS

| | | |
|---|---|---|
| 4,964,265 A | 10/1990 | Young |
| 4,964,266 A | 10/1990 | Kolb |
| 4,981,120 A | 1/1991 | Mangum, Jr. |
| 5,020,309 A | 6/1991 | Hopkins |
| 5,415,245 A * | 5/1995 | Hammond ................. 180/165 |
| 5,441,116 A | 8/1995 | Rodriguez |
| 5,445,014 A | 8/1995 | Fiorenza, II et al. |
| 5,713,320 A | 2/1998 | Pfaff et al. |
| 5,744,921 A | 4/1998 | Makaran |
| 5,794,422 A | 8/1998 | Reimers et al. |
| 5,806,294 A | 9/1998 | Strieber |
| 5,821,651 A | 10/1998 | Lansberry et al. |
| 5,862,497 A | 1/1999 | Yano et al. |
| 5,875,864 A | 3/1999 | Yano et al. |
| 5,880,533 A | 3/1999 | Arai et al. |
| 5,895,338 A | 4/1999 | Dins et al. |
| 5,929,608 A | 7/1999 | Ibaraki et al. |
| 5,939,848 A | 8/1999 | Yano et al. |

* cited by examiner

CONTROL SYSTEM FOR AN ELECTRIC MOTOR HAVING AN INTEGRAL FLYWHEEL ROTOR

RELATED APPLICATIONS

This application claims the benefit of prior filed U.S. Provisional Pat. Application No. 60/184,525, entitled CONTROL SYSTEM FOR AN ELECTRIC MOTOR HAVING AN INTEGRAL FLYWHEEL ROTOR, filed on Feb. 24, 2000, which is incorporated herein by reference.

BACKGROUND OF THE INVENTION

The present invention relates to electric motors and, more particularly, to control systems for starter motors used with internal combustion engines.

Lawn mowers, tractors, automobiles, and other power equipment and vehicles often rely on internal combustion engines to supply power to drive various tools such as mower blades, power-take-off units, and the like; to supply power for locomotion; or both. An internal combustion engine may be started using an electric starter motor. The engine may also be coupled to a generator or alternator that produces electric energy. Energy from the alternator is used to recharge a battery that powers the starter motor during starting. The battery also provides power to the electrical system of the power equipment or vehicle and any internal or external devices connected to the electrical system.

While engines with starter motors and electrical systems as described above are functional, they have many shortcomings. Some of these relate to the electric starter. Typical electric starters for internal combustion engines include gearing for driving the engine flywheel. Once the internal combustion engine is started, the electric starter is mechanically disengaged from the flywheel. The gears and the engagement/disengagement mechanism are relatively complex and expensive to manufacture. In addition, these components are subject to wear and, therefore, have a limited operational life. Conventional starters are also noisy, which is an annoyance to people operating them, and have relatively long start times.

Other shortcomings with conventional starting systems relate to the alternators used in the systems. Known alternators usually must be coupled to voltage regulators to provide suitable voltage output. The need to have a voltage regulator adds cost and complexity to a starting system. Typical alternators are also incapable of supplying sufficient current output to meet the requirements of modern electric power demands. Yet another disadvantage of conventional starting systems is that they require a separate starter motor and alternator (or generator). This increases the cost of a starting system.

There have been some attempts to improve starting systems for internal combustion engines. For example, the starting system disclosed in U.S. Pat. No. 4,720,638 (the "'638 patent"), commonly assigned with the present application to Briggs & Stratton Corporation, discloses an electronically-commutated, DC starter motor/alternator for an internal combustion engine. The system disclosed in the '638 patent does not require a separate starter and alternator. Instead, the system uses a stator mounted directly to the engine and a rotor that also acts as a mechanical flywheel. This type of configuration is sometimes referred to as an "integral flywheel-rotor" starter. However, the electronic control system disclosed in the '638 patent does not provide all of the regulation and control functions that are desirable for modern applications (such as using an internal combustion engine as an electric-power-generation unit for backup and remote supply of electric power). Another deficiency of the system shown in the '638 patent is that its flywheel is relatively heavy and has a relatively inefficient electromagnetic design.

Accordingly, there is a need for an improved control system for starter motors, including integral flywheel-rotor starters.

SUMMARY OF THE INVENTION

The present invention provides a control system for an electric motor used with an internal combustion engine wherein the engine flywheel and the motor's rotor are integrally-formed. The system preferably includes a starter motor, although it may be used with other types of motors. The motor has a stator mounted co-axially with the engine crankshaft and a rotor positioned radially outward from the stator. A sensor is positioned near the rotor for sensing its rotational speed. The sensor is coupled to a controller. The controller is operable to deliver an output signal to the stator to start the internal combustion engine.

While the starter motor starts the engine, a processor provides a signal resulting in the starter motor "stepping" (i.e., incrementing the speed by discrete values) from a low speed to a high speed. Once the engine has started and the engine speed is greater than a predetermined trigger speed, the processor delivers another output signal such that the motor commutates at a speed that is less than the speed of the rotor. This results in a motor slip, and by commutating the motor in this manner the motor acts as a generator. The motor slip is regulated when the motor is generating electric power so that the motor produces a constant output voltage.

Other features and advantages of the invention will become apparent by consideration of the detailed description and accompanying drawings.

DETAILED DESCRIPTION

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 1:
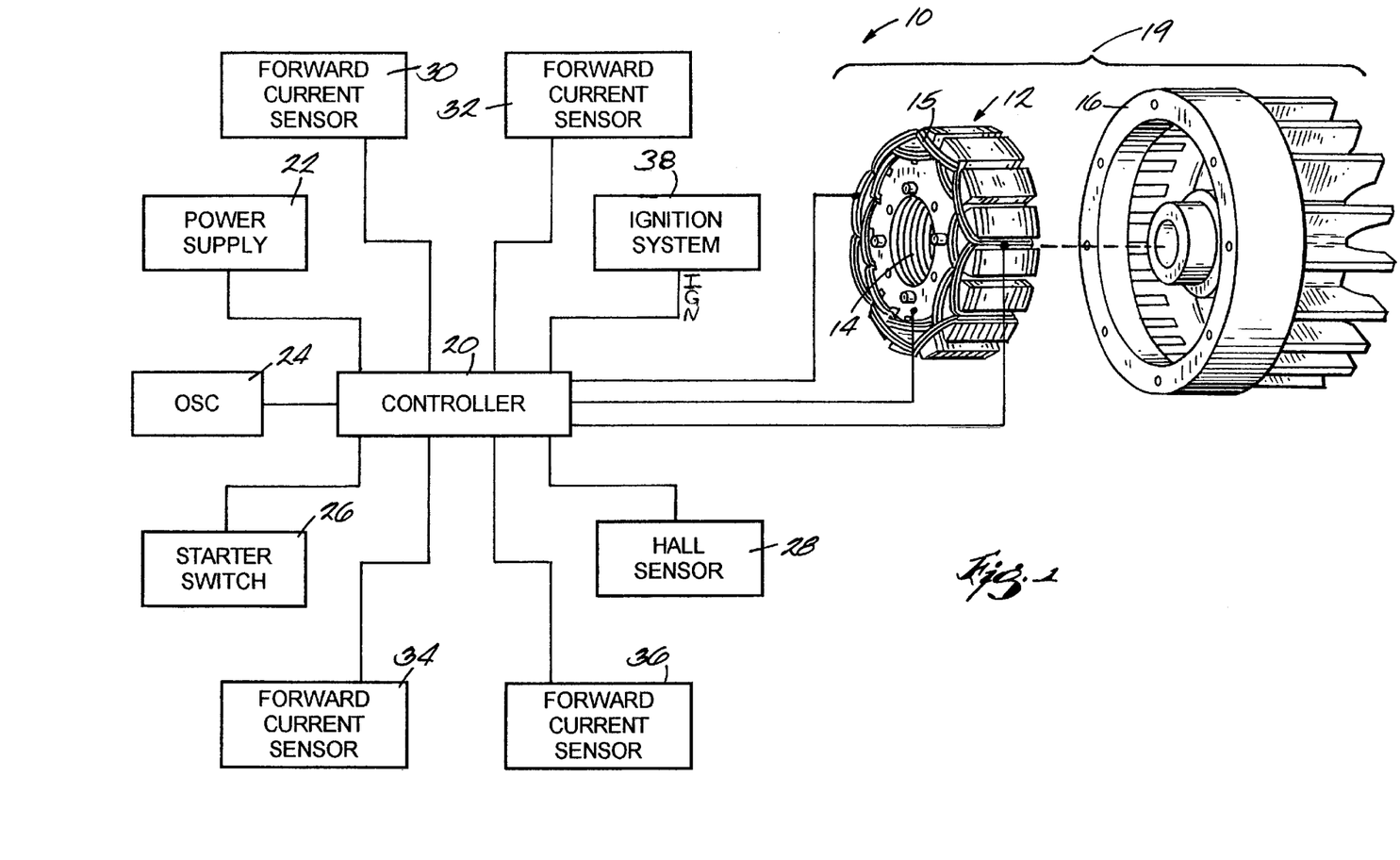
FIG. 1 is a schematic, partially exploded view of a starter motor and control system.

A system 10 embodying the present invention is shown in an exploded view in FIG. 1. The system 10 includes a stator 12 with a central opening 14. The stator 12 is designed to be mounted on an engine (not shown) such that the drive shaft (not shown) of the engine is inserted through the opening 14. The stator 12 is designed for a three-phase induction motor and has three stator windings 15 (one for each phase). Preferably, the stator 12 is an eight-pole stator and the stator winding 15 for each phase is a five-six pitch winding where the first four poles are wound according to standard winding practices and the second four poles are wound in a reverse direction. This "half-integer" winding has a lower impedance than standard windings. In addition, the half-integer winding results in the leads to the stator being positioned in more accessible locations. An example stator having a half-integer winding is disclosed in co-pending U.S. patent application Ser. No. 09/774,649, entitled STATOR FOR AN ELECTRIC MOTOR/GENERATOR WITH A HALF-INTEGER WINDING, which is incorporated herein by reference.

A flywheel-rotor 16 is co-axially aligned with the stator 12 and coupled to the drive shaft of the engine. The rotor 16 has a plurality of teeth (not shown) that are comprised of portions of the rotor laminations. In the rotor 16, the laminations are not visible because a layer of cast aluminum covers the laminations. Preferably, the rotor has eleven symmetrically disposed teeth and one gap (also not shown), where a tooth is missing. The gap is used as an indicator or index to mark an index point of the rotor. A rotor suitable for use with the present invention is shown in U.S. patent application Ser. No. 09/442,560 filed on Nov. 18, 1999, the disclosure of which is incorporated by reference herein. Additional aspects of the flywheel-rotor 16 will be discussed below.

The stator 12 and rotor 16 form a motor/generator 19. Each winding 15 of the stator 12 is coupled to a controller 20. The controller 20 is powered by a power supply 22 and receives a timing input from an oscillator 24. The controller 20 also receives input from a starter switch 26 of the engine, a Hall effect or other sensor 28 that measures the speed or RPM of the rotor 16 using the teeth of the rotor, and one or more current sensors that measure current being provided to and received from the windings 15. In the embodiment shown in FIG. 2 and as discussed in further detail below, the one or more current sensors include first, second, and third "forward" current sensors 30, 32, and 34, and a "reverse" current sensor 36.

Furthermore, the controller 20 produces an ignition output IGN to control an ignition system 38 of the engine. The IGN output is delivered to the ignition system 38 over an ignition bus IGN_BUS (FIG. 2).

Figure 2:
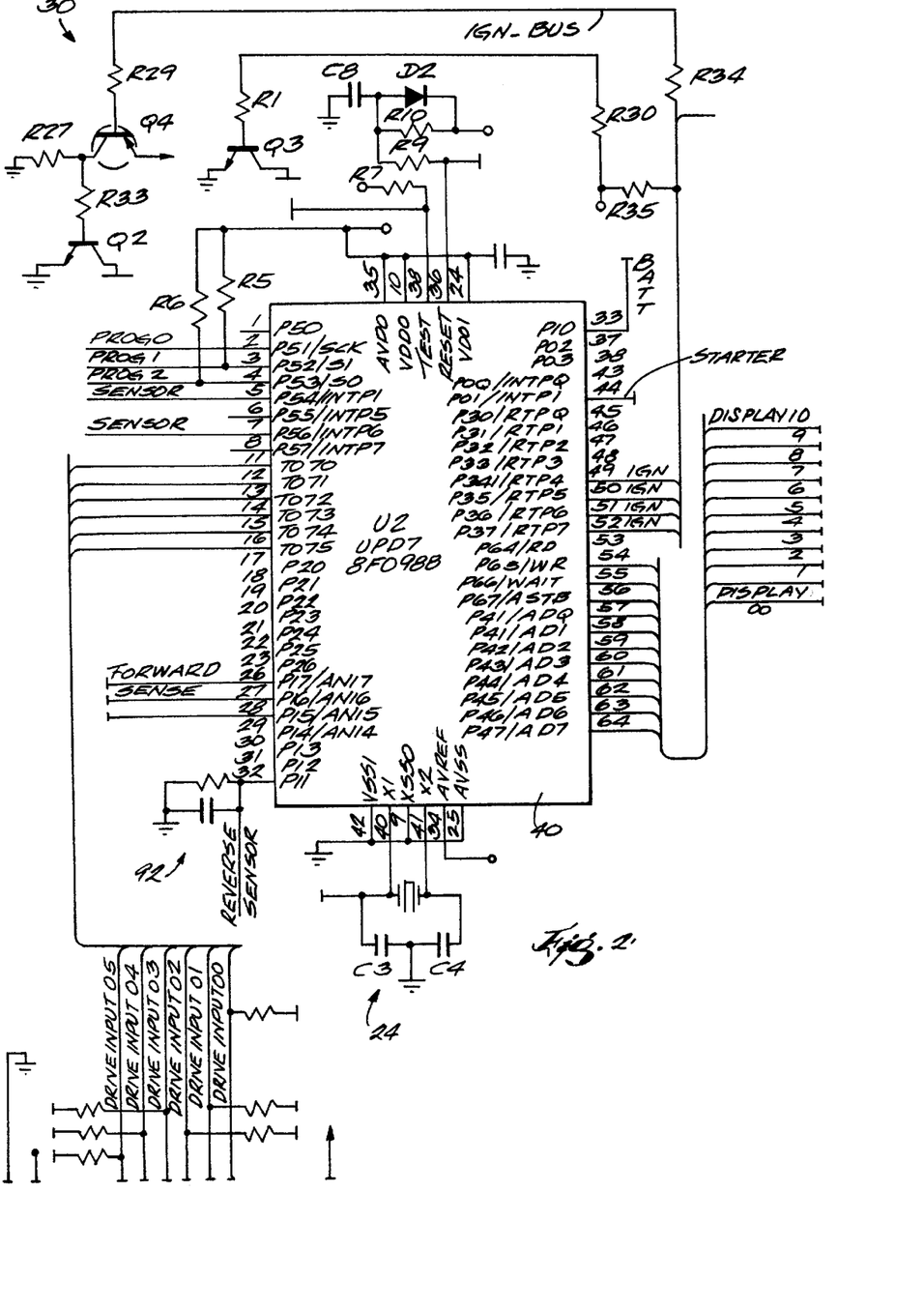
FIG. 2 is a circuit diagram of a processor that may be used in the control system of FIG. 1.
Figure 2A:
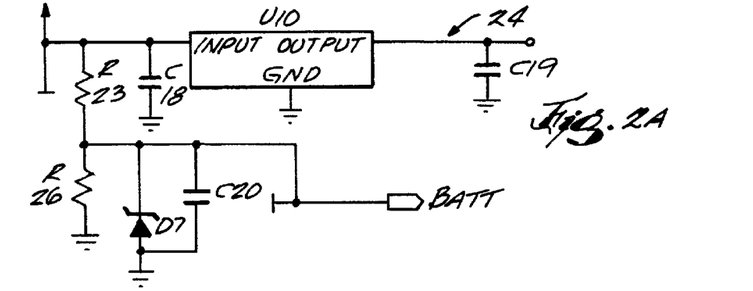
FIG. 2A is a circuit diagram of a power supply suitable for use with the processor shown in FIG. 2.

As best seen by reference to FIG. 2, the controller 20 includes a main processor 40. Preferably, the processor 40 is a programmable controller or similar device that is designed for three-phase motor control. A controller suitable for use in the invention is an NEC model UPD78F0988 controller. As will be discussed in greater detail, the processor 40 produces a drive signal that is delivered to the stator 12 to operate the stator 12 and rotor 16 as a starter motor. The signal to the stator 12 can also be controlled so that the stator 12 and rotor 16 act as a generator. The processor 40 receives power from the power supply 20 over the line BATT. The processor 40 also receives input from the Hall sensor 28 over the SENSOR lines and input from the starter switch over the STARTER line. Additionally, the processor 40 receives input from the forward current sensors 30, 32 and 34 over the FORWARD SENSOR lines and from the reverse current sensor 36 over the REVERSE SENSOR line. In an alternative embodiment of the invention, the processor 40 may receive programming inputs over programming lines PROG 0–PROG 3 and produce an output display signal over lines DISPLAY 0–DISPLAY 10.

Figure 3:
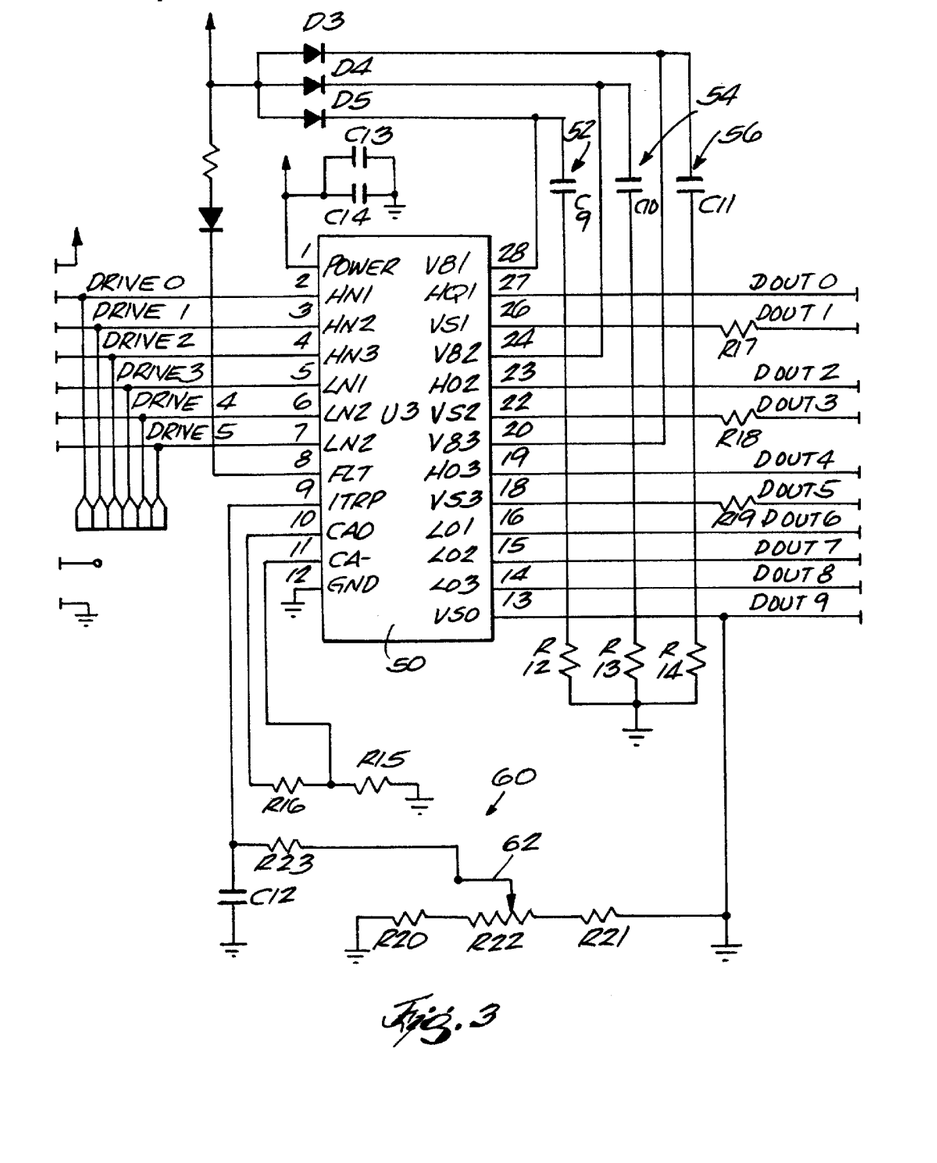
FIG. 3 is a circuit diagram of a driver circuit that may be used in the control system of FIG. 1.

The processor 40 delivers a drive signal over lines DRIVE 0–DRIVE 5 to a high voltage driver 50 (FIG. 3). Preferably, the driver 50 is an integrated circuit that converts the output from the processor 40, which is a digital, 5-volt-logic signal, to a signal capable of driving relatively high-current power devices. A driver suitable for use in the invention is an International Rectifier model 2430 integrated circuit. The driver 50 also permits the implementation of a floating upper rail or high-voltage reference so that the controller 20 does not need a true ground reference. Capacitors 52, 54, and 56 are coupled to the driver 50 and act as small power supplies that power the upper rail devices in a bridge circuit of an inverter (discussed below). The driver 50 also has a "dead band" preventative feature to reduce or eliminate the possibility of short circuiting the upper and lower rail devices in the bridge circuit. Specifically, the driver delays the switching between the upper and lower devices so that they are not turned on simultaneously. The driver 50 may optionally be implemented with a current feedback device to measure the output current of the driver. It is believed that a Hall effect sensor may be used to measure the output current and that the signal sensed by the sensor may be fed back to the driver 50 to sense stall and other fault conditions in the engine. Alternatively, feedback may be obtained using a shunt network 60 having a potentiometer 62, where the potentiometer 62 is adjusted based on current flowing through a shunt coupled to the bridge circuit.

Figure 4:
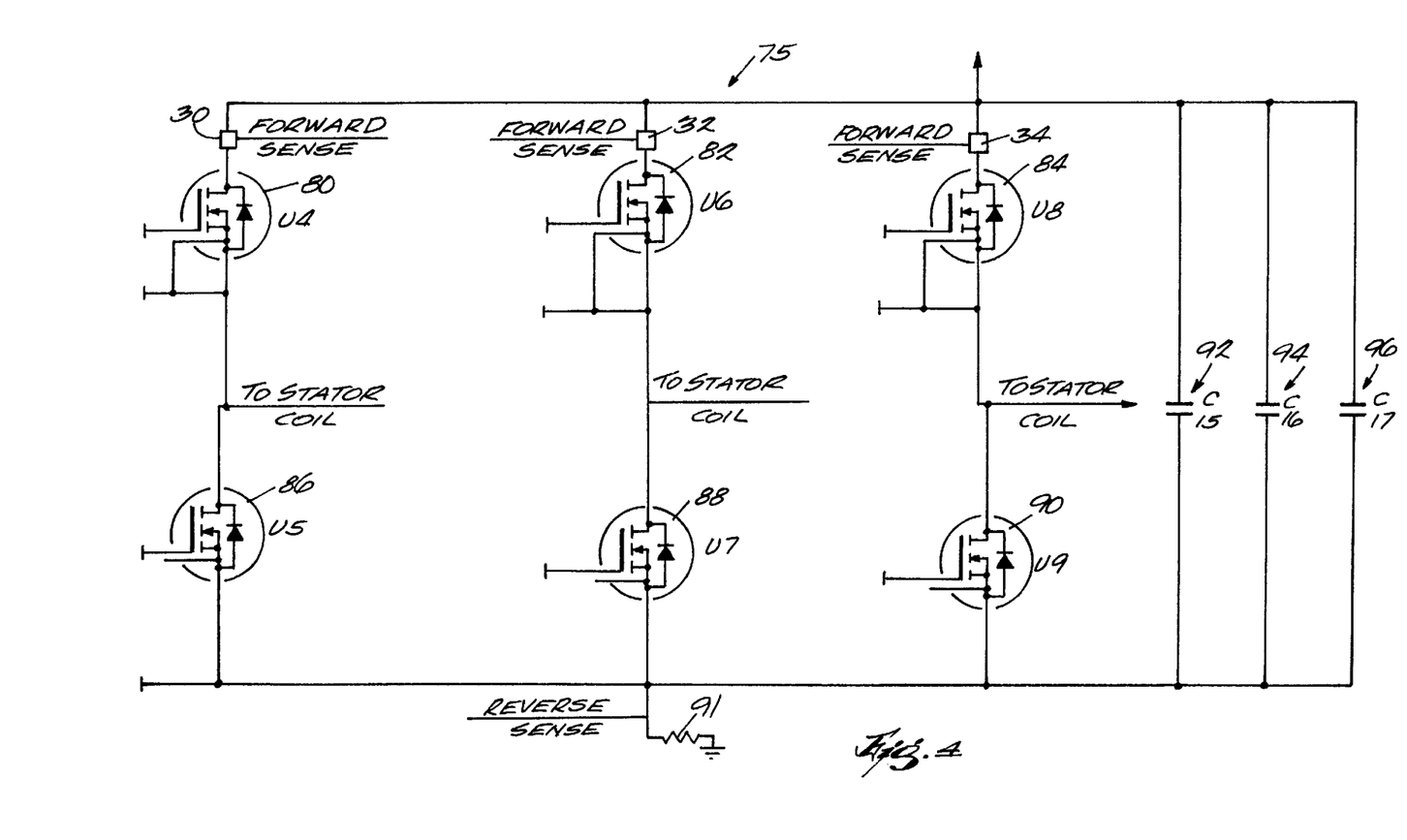
FIG. 4 is a circuit diagram of a bridge circuit that may be used in the control system of FIG. 1.

The driver 50 produces an output that is delivered on lines DOUT 0–DOUT 9 to a bridge circuit 75 (FIG.4). The bridge circuit 75 is a three-phase circuit having three upper-rail devices 80, 82, and 84 and three lower-rail devices 86, 88, and 90. The bridge circuit 75 preferably uses MOSFETS in the upper and lower rail devices, but BJTs, IGBT's, and other types of switching devices may be used in the circuit. In addition, for the embodiment shown, the forward current sensors 80, 82 and 84 are connected in circuit in the upper rail. The forward current sensors 30, 32 and 34 measure current flow from the power source (e.g., a vehicle battery) to the windings 15. This measured current is referred to as the forward current. Each forward current sensor 30, 32 and 34 produces a zero-to-five volt signal proportional to the sensed forward current, which is provided to the processor 40. In an alternative embodiment, the forward current sensors 30, 32 and 34 are incorporated into the upper-rail MOSFETS and sense the current provided by the MOSFETS to the windings 15. Furthermore, depending on the switching devices used, a driver 50 may not be required.

The bridge circuit 75 further includes a reverse current sensor 36 (FIG. 1) that senses current flow from the windings 15 to the battery (i.e., a "reverse" current). For the embodiment shown, the reverse current sensor 36 includes shunt resistor 91, and RC filter 92. Other current sensors may be used in place of the current sensors 30, 32, 34, 36 and, alternatively, the current sensors 30, 32, 34, 36 may be combined into one current sensing circuit.

The bridge circuit 75 further includes three relatively large capacitors 93, 94, and 96 to hold the power supply voltage up while the bridge circuit 75 is drawing current and to suppress noise in the circuit output. The hardware components of the system 10 may be further understood by reviewing the operation of the software installed on the processor 40.

Figure 5:
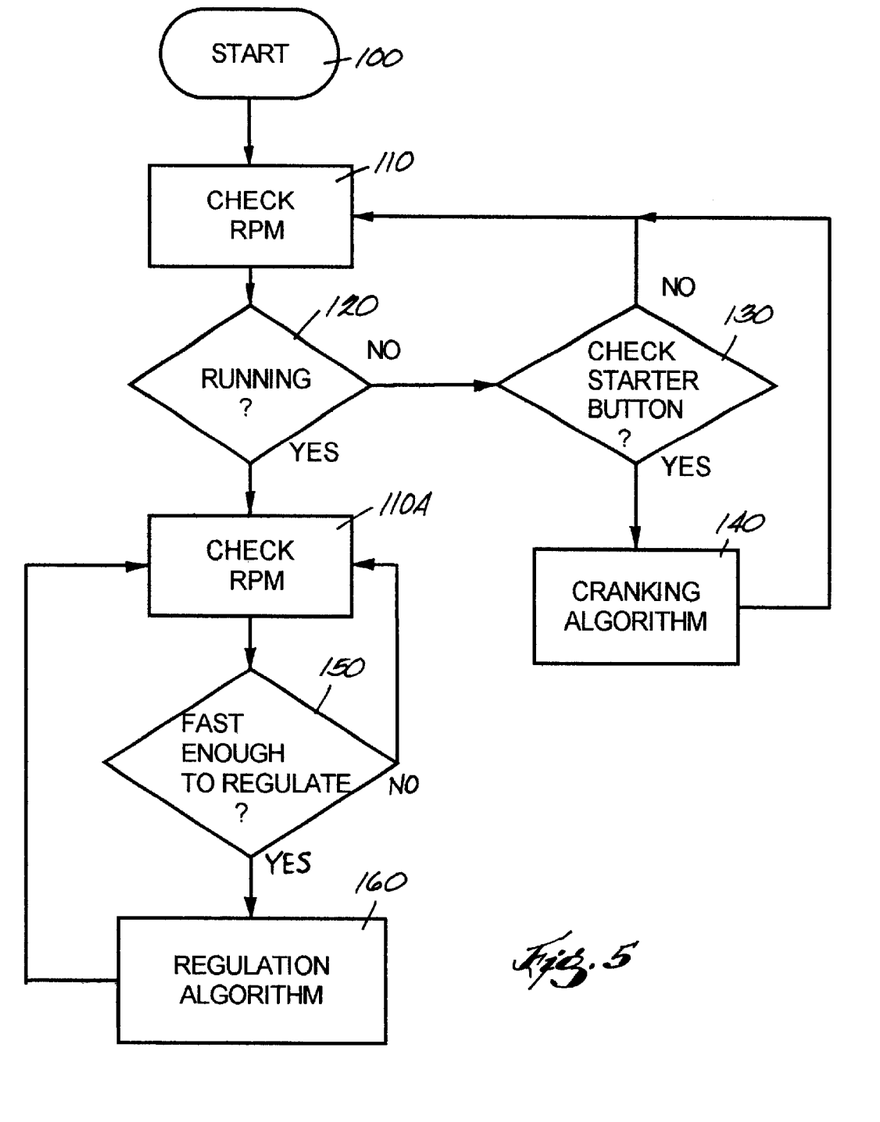
FIG. 5 is a flowchart of the software that may be installed on the processor shown in FIG. 2.

With reference to FIG. 5, the software initializes the processor 40 at step 100. The registers in the processor 40 are set and data to initialize parameters is read from memory. Once initialization is complete, the processor 40 checks the engine RPM at step 110 by reading the output of the sensor 28. Specifically, the sensor 28 senses the rotation of the eleven teeth arranged around the perimeter of the rotor 16. The gaps between the teeth are sensed as low values or time stamps. In this way, RPM is checked eleven times per revolution. Once the RPM has been checked, the processor 40 determines at step 120 whether the engine is running. The engine is running if a certain minimum RPM has been sensed.

If the engine is not running, the processor checks at 130 for input from or engagement of the engine starter switch 26. If the starter switch 26 is not engaged, the processor continues to check the RPM. This process continues until 1) the RPM reaches a level that indicates that the engine is running or 2) the starter switch 26 is engaged. Of course, it should be noted that while it is presumed that the system 10 will most likely be implemented with an electric starter, it is possible to implement an alternative embodiment of the system 10 using a recoil-type starter (e.g., a pull-rope starter). If a system were implemented using a recoil-type starter, the system 10 would perform regulation as described below, but would not check for engagement of the starter switch. Alternatively, a recoil-type starter could be used as a backup for an electric starter system.

For electric starter systems implemented with a starter switch 26, the processor 40 executes a cranking algorithm 140 (FIG. 6) when the starter switch 26 is engaged. The cranking algorithm 140 starts the engine by manipulating the drive signal delivered to the stator 12. The processor 40 sets a certain speed, and instructs the motor 19 (through the drive signal) to commutate at that speed. In particular, the processor 40 implements a step control scheme or sequence to step the rotational speed of the motor 19.

Figure 6:
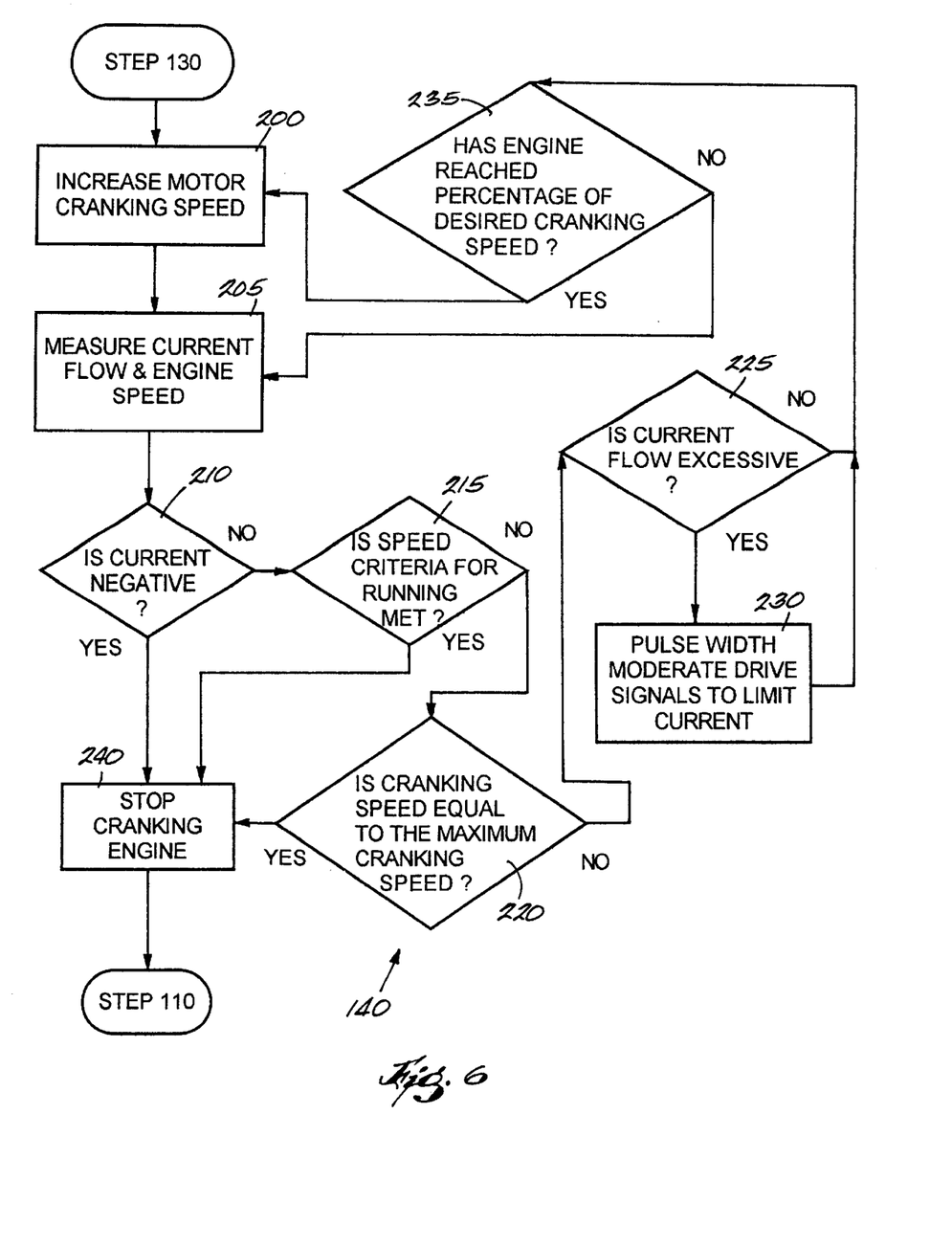
FIG. 6 is a flowchart of the cranking process implemented by the software shown in FIG. 5.

As shown in FIG. 6, at step 200, a current with an initial frequency is delivered to the windings 15. The current in the windings creates a magnetic field that interacts with the rotor causing the rotor and, consequently, the engine shaft to rotate. The frequency of the current is referred to as the cranking frequency or may be expressed as a cranking speed. For the embodiment shown, execution of the cranking algorithm 140 causes the processor 40 to initially crank the motor 19 at a speed of 100 RPM. Furthermore, if the processor 40 enters step 200 from step 235 (discussed below), the processor 40 increments or steps the cranking speed by 100 RPM. For other embodiments, the initial cranking speed and the speed of each step increase may vary.

At step 205, the processor 40 obtains measurements from the speed sensor 28 and the current sensors 30, 32, 34 and 36 (FIG. 1). Based on the sensed measurements, the processor 40 calculates the rotational speed of the rotor, and calculates the current being sensed by the current sensors 30, 32, 34 and 36.

At step 210, the processor determines whether the sensed current by the reverse current sensor 36 has a significant current flow. If the sensed current is significant, then the processor 40 determines that the motor 12 is acting as a generator. In other words, if the sensed current is significant, then the engine is controlling the rotation of the engine shaft (and the rotor) and the frequency of the magnetic field being generated by the stator lags the rotational frequency of the magnetic field being produced by the rotor. This results in the motor acting as a generator and, consequently, a current flows from the stator windings 15 to the power source (e.g., the battery). The reverse current sensor 36 senses the generated current. If the current is significant, then the processor assumes the engine has started, and proceeds to step 240. If the reverse current is small or is nonexistent (i.e., either the motor is controlling the engine, or neither the motor nor the engine is controlling), then the processor 40 proceeds to step 215. In addition, the processor 40 may require multiple significant reverse current readings before proceeding to step 240. By requiring multiple readings, the algorithm prevents error spikes from causing the processor 40 to mistakenly proceed to step 240.

At step 215, the processor 40 determines whether the measured speed exceeds a starting criteria set point signifying that the engine is controlling the motor (i.e., the engine has started). The starting criteria set point varies depending on the frequency of the current being applied to the stator. For example, as shown in Table 1, when the cranking speed is at 100 RPM, the starting criteria set point is 199 RPM. If the processor 40 measures a rotor speed greater than 199 RPM, then the processor 40 determines that the engine is in its acceleration ramp and has started. Similarly, when the cranking speed is 700 RPM and if the processor 40 measures a rotor speed greater than 703 RPM, then the processor 40 determines that the engine is in its acceleration ramp and has started. Refer to Table 1 for other starting criteria set points.

TABLE 1

| CRANKING SPEED (RPM) | STARTING CRITERIA SET POINT (RPM) | EIGHTY PERCENT OF CRANKING SPEED RPM |
|---|---|---|
| 100 | 199 | 80 |
| 200 | 280 | 160 |
| 300 | 350 | 240 |
| 400 | 433 | 320 |
| 500 | 512 | 400 |
| 600 | 605 | 480 |
| 700 | 703 | 560 |
| 800 | 802 | 640 |
| 900 | 901 | 720 |
| 1000 | 1000 | 800 |
| 1100 | | |

The starting criteria set points in Table 1 were empirically found to be desirable points for a Model 3034 engine manufactured by Briggs & Stratton, Inc. Other running criteria set points may be used for other engines.

For step 215, the processor 40 determines whether the engine is on its acceleration curve in the starting cycle. If the engine has started on its acceleration curve, then the engine is in the process of taking control of the motor. Since the speed of the engine is being measured in ¹⁄₁₂th intervals, it is possible for the engine to initiate its acceleration ramp prior to the processor stepping to the next cranking speed (step 200). For example, if the frequency of the current being provided to the motor is 500 RPMs and the processor calculates that the rotor is rotating at 530 RPMs, the processor determines that the engine is accelerating and has started. It is unnecessary for the cranking algorithm to continue through the remaining steps and the processor 40 proceeds to step 540. Otherwise the processor 40 proceeds to step 220.

At step 220, the processor 40 determines whether the cranking speed is equal to a maximum cranking speed (e.g., 1100 RPM). If the cranking speed is equal to the maximum cranking speed, then the processor 80 determines that the engine either has started but has not met the other two criteria (steps 210 or 215) or will not start (e.g., the vehicle may not contain fuel). The maximum cranking speed is equal to or greater than the maximum speed necessary to start the engine. If step 220 is met, then the processor 40 proceeds to act 240. Otherwise, the processor 40 proceeds to step 225.

At step 225, the processor 40 determines whether the measured current from the forward current sensors 30, 32 and 34 is excessive. If the current is excessive, then the processor 40 proceeds to step 230. For example, an excessive current may occur when the engine is cold. If the engine is cold, it will require a larger current to properly excite the rotor to cause the shaft to rotate. If the required current is too large, then the switching devices 80–90 (FIG. 4) may become damaged. To prevent this from occurring, the processor 40 pulses the power to the motor (step 230). In other words, the processor 40 controls the driver 50 (FIG. 3) such that the drive signals to the switching devices 80–90 are pulse width modulated to limit the current through the switching devices 80–90. For example, if MOSFETs 80, 88 and 90 (FIG. 4) are active, then the processor 40 pulses MOSFETs 88 and 90. Pulsing MOSFETs 88 and 90 reduces the current flow to the motor, and the processor 40 proceeds to step 235. If the current is not excessive, then the processor 40 stops pulsing the switching devices 80–90 and proceeds to step 235.

At step 235, the processor 40 determines whether the rotor rotational speed has reached a percentage of a desired speed. If the sensor reads an RPM equal to or greater than a predetermined percentage of the desired speed, such as 80 percent as shown in Table 1, then the cranking algorithm 140 jumps or steps to the next increment (step 200). In the embodiment shown, each increment is a 100-RPM increment. If the RPM sensed by the sensor 28 is less than the predetermined percentage, the processor 40 continues to drive the motor 19 at the present speed and proceeds to step 205.

Thus, the processor 40 proceeds through the cranking algorithm until 1) the processor senses a substantial current going from the stator windings to the power source (i.e., a substantial reverse current), 2) the processor senses that the engine speed is greater than a running criteria RPM set point, or 3) the cranking speed is equal to a maximum cranking speed. Once one of the criteria is met, then the processor 40 stops the cranking algorithm and proceeds to act 110.

Upon exiting the cranking algorithm 140, the processor 40 again checks the RPM at step 110. If the engine has started and is running the processor proceeds to step 110A. The sensed speed is then checked against a preset speed (step 150), such as 1800 RPM, to determine whether the speed of the engine is fast enough to be regulated using the starter motor 19. If the speed of the engine has not reached a sufficient level to regulate, then the processor 40 continues to check the speed of the engine. Once the RPM has surpassed the preset level, the processor 40 implements a regulation algorithm 160.

The purpose of delaying regulation of the engine until it has reached a predetermined minimum regulation speed is to avoid prematurely causing the engine to stumble or stall by applying a load, such as occurs when the motor/generator 19 is used to generate electricity. The preset speed specified above, 1800 RPM, was selected for a model 3034 engine manufactured by Briggs & Stratton, Inc. However, the predetermined trigger point will change depending on the type and size of the engine used with the control system 10.

Once the engine has started and is running at a sufficient speed to permit regulation, the motor 19 may be used as a generator. To use the motor 19 as a generator, the frequency of the drive signal delivered to the bridge circuit 75 is modified so that the motor 19 is run at a slower speed than the speed of the engine. If the frequency of the drive signal to the bridge circuit 75 is less than the motor speed, then the motor will act like a generator. For example, if the engine is running at 3000 RPM, the motor 19 may be operated as a generator to produce a voltage by driving the bridge circuit 75 at a rate resulting in the motor running at a slower RPM, such as 2900 RPM. This results in a 100-RPM slip. By controlling the slip, the amplitude of the output voltage of the motor 19 may be regulated at a constant level. In other words, the processor 40 tracks the speed of the engine and commutates the motor 19 at a slower frequency. The voltage is monitored and the drive signal to the motor 19 (specifically the stator 12) is adjusted until the desired voltage level is obtained. These general concepts are further explained below.

Figure 7:
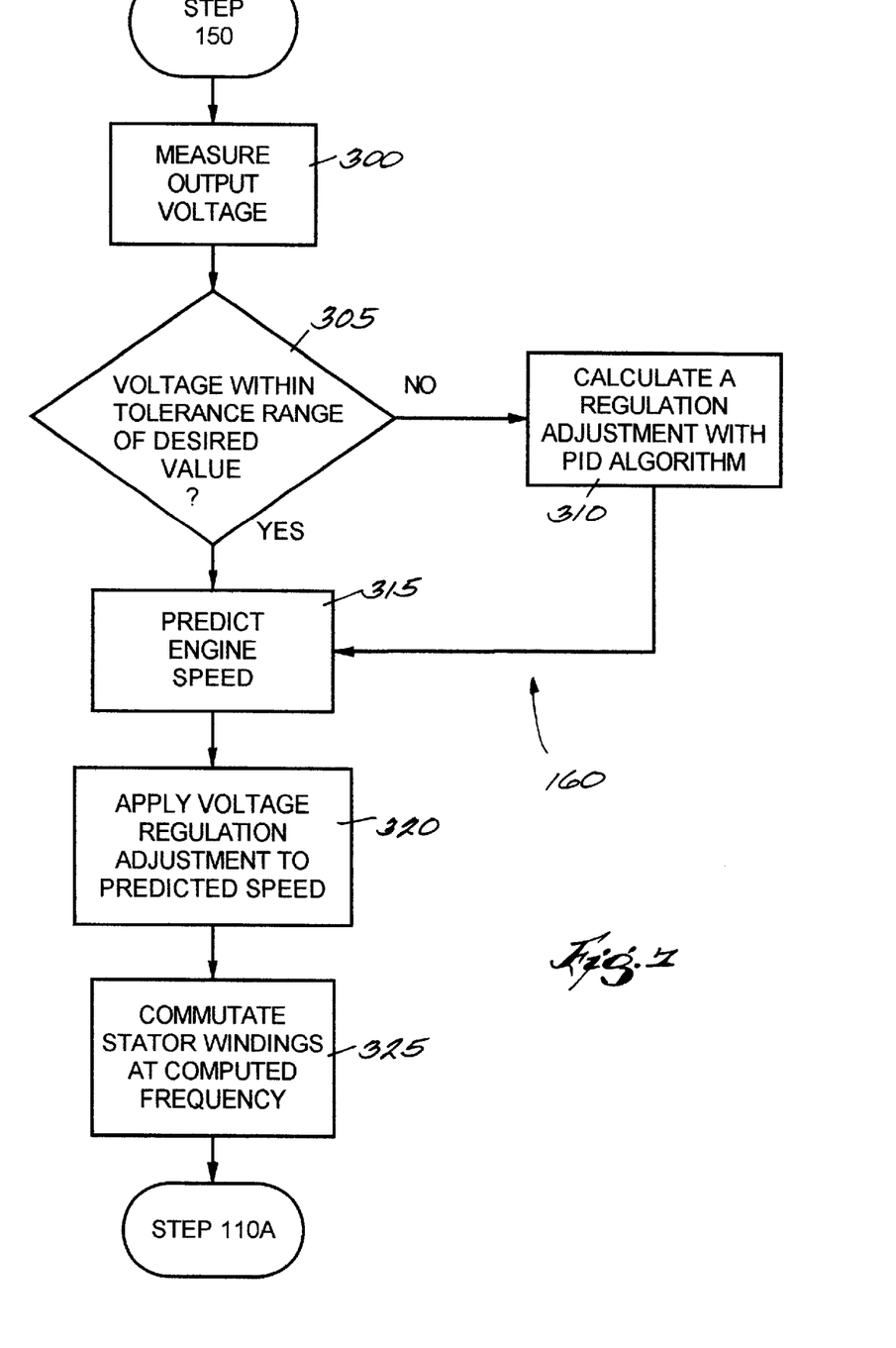
FIG. 7 is a flowchart of the regulation process implemented by the software shown in FIG. 5.

As shown in FIG. 7 and at step 300, the regulation algorithm 160 checks the voltage output of the motor 19 (as it operates as a generator). At step 305, the processor 40 determines whether the voltage is within a tolerance range of a desired voltage. For example, if the voltage is charging a twelve-volt vehicle battery, then the processor 40 determines whether the voltage is between 11.9 and 12.1 volts. If the voltage is within this range, then the processor 40 proceeds to step 315. If the voltage is outside of this range, then the processor 40 proceeds to step 310.

At step 310, the processor 40 calculates a new regulation adjustment (i.e., a new slip). The new regulation adjustment is a function of the previous regulation adjustment, the error between the measured voltage and the desired voltage, the derivative of the error, and the integral of the error (i.e., is calculated using a PID control). For example, the regulation adjustment is calculated by summing the prior regulation adjustment, the voltage error multiplied by a constant, the derivative of the error multiplied by a second constant and the integral of the error multiplied by a third constant (see, e.g., formula 1).

$$\text{ADJUSTMENT} = \text{PRIOR ADJUSTMENT} + (K1) * \text{ERROR} + (K2) * \text{DERIVATIVE OF THE ERROR} + (K3) * \text{INTEGRAL OF THE ERROR} \quad \text{FORMULA 1}$$

where $K1=(\frac{1}{16})$, $K2=(\frac{1}{128})$, $K3=(\frac{1}{64})$.

Of course, other formulas or constants may be used to calculate the regulation adjustment.

At step 315, the processor 40 predicts an engine speed for the next revolution of the engine. For the embodiment described herein, the estimated or predicted speed of the next revolution is determined using an intercyclic-speed-variation methodology. An intercyclic-speed-variation analysis involves predicting the rotational speed of the next revolution based on past "like" or "similar" revolutions. For example, a four-stroke engine sequence includes a first crankshaft revolution during which a combustion event occurs in the combustion chamber and a second, subsequent crankshaft revolution during which no combustion event occurs in the combustion chamber. The period of the most recent revolution (e.g., the crankshaft revolution during which a combustion event occurs) is compared to "like" or "similar" revolutions (e.g., past crankshaft revolutions during which a combustion event occurs.) For example, if the periods of successive "like" revolutions is decreasing, the engine speed is increasing. The next occurrence of the "like" revolution is identified and a prediction is made as to whether the engine speed will decrease, increase or remain substantially constant. For example, it may be assumed that the engine speed will continue along the same trend according to a linear relationship. In other words, if the engine speed is decreasing, it is assumed that the engine speed will continue to decrease for the next "like" revolution in a linear fashion. Consequently, an engine speed can be predicted. Intercyclic-speed variation methods are more fully discussed in U.S. Pat. No. 5,445,014, entitled ELECTRONINC ENGINE LOAD AND REVOLUTION SENSING DEVICE, the disclosure of which is hereby incorporated by reference herein.

At step 320, the processor 40 applies the regulation adjustment to the predicted engine speed. Based on the result, the motor commutates the stator windings 15 at the controlled output frequency resulting in a voltage being generated (step 325). After the processor 40 executes the regulation algorithm, it checks the RPM at 110A to ensure that the engine is still at or above a predetermined minimum speed. The processor then executes steps 150 and 160. Provided the engine speed remains at or above the predetermined minimum speed, steps 110A, 150, and 160 are repeatedly executed until the engine is shut down. If the engine speed falls below the predetermined minimum speed, steps 110A and 150 are repeatedly executed.

Figure 8:
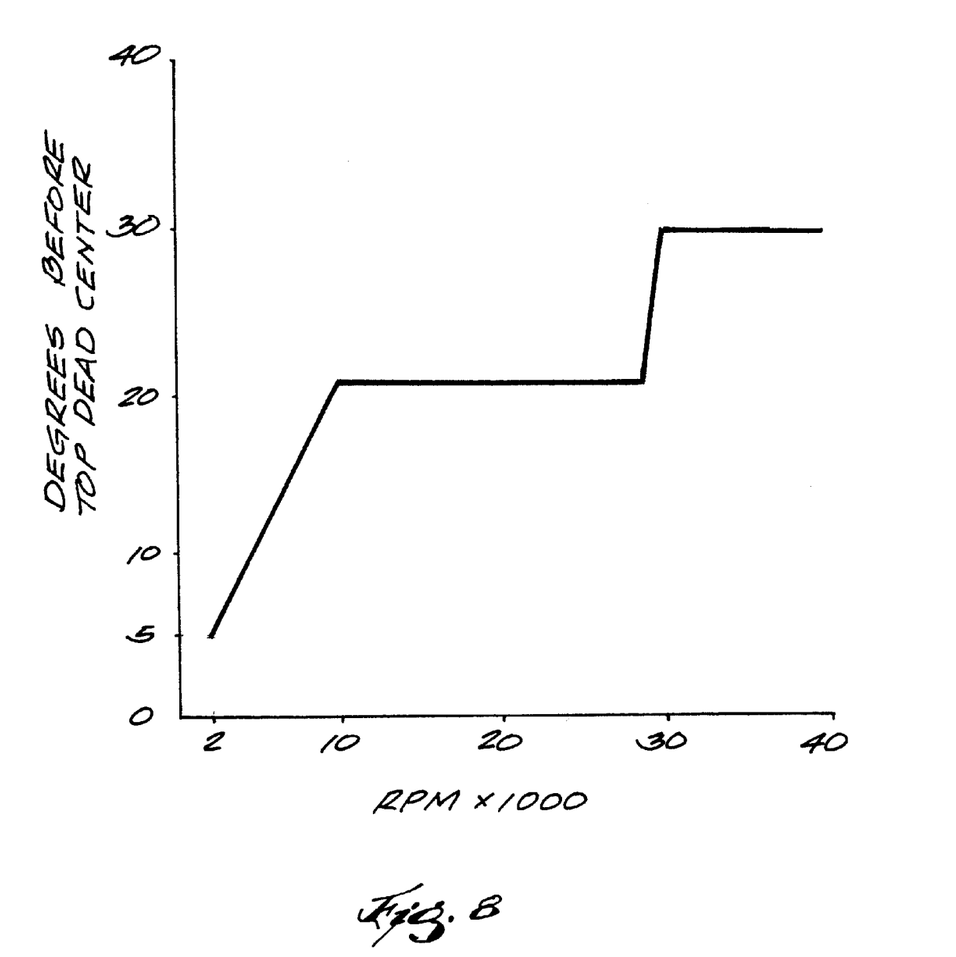
FIG. 8 is a chart displaying a timing curve for an engine used in connection with the starter motor and control system of the invention.

The processor 40 may also regulate the ignition of the engine by sending the IGN output signal to the ignition system 38. Control by the processor 40 is based on the sensed RPM. As noted, the processor 40 obtains eleven speed indications per revolution when the system is implemented using the rotor 16. At one point in the revolution, one tooth is missing on the rotor and that point is used as an index to sense completion of one revolution. Based on that index, a determination may be made as to when to fire the ignition system. Since the RPM is continually checked, an ignition angle appropriate for the current speed of the engine may also be determined. The processor may also be used to retard or advance ignition timing. In the embodiment described herein, an empirical chart showing the firing angle is provided in FIG. 8.

As can be seen from the above, the present invention provides a controller for a starter motor of an internal combustion engine. Various features and advantages of the invention are set forth in the following claims.

What is claimed is:

1. A control system for an electric motor having a stator and an integral flywheel-rotor with a plurality of position indicators, the system comprising:
    a sensor that generates a signal based on the movement of the position indicators of the rotor; and
    a controller coupled to the sensor to receive the signal and operable to deliver an output signal to the stator such that the motor is stepped from a low rotational speed to a high rotational speed in a series of increments, wherein the controller checks the rotational speed of the rotor before stepping the motor to the next increment.

2. A control system as claimed in claim 1, wherein the controller steps the motor from the low rotational speed to the high rotational speed in discrete increments.

3. A control system as claimed in claim 1, further comprising a starter switch coupled to the controller, and wherein the controller steps the motor from the low rotational speed to the high rotational speed after the starter switch is engaged.

4. A control system as claimed in claim 1, further comprising an ignition system coupled to the controller, and wherein the controller is operable to generate an ignition signal based on the signal of the sensor.

5. A control system as claimed in claim 1, wherein the controller checks the rotational speed of the rotor to determine whether the engine has a rotational speed greater than a rotational speed indicative of engine starting.

6. A control system as claimed in claim 5, wherein each increment of rotational speed has a distinct speed indicative of engine starting.

7. A control system as claimed in claim 1, wherein the motor includes at least one winding, wherein the control system further comprises a second sensor that generates a signal based on a current flow from the stator to a power source, and wherein the controller checks the current to determine whether the motor has started.

8. A control system for a motor having a stator and an integral flywheel rotor, the system comprising:
    a sensor that generates a signal based on the rotation of the rotor; and
    a controller coupled to the sensor to receive the signal, and operable to deliver an output signal to the stator such that the motor is commutated at a rotational speed that is less than the rotational speed of the rotor to generate a slip and to vary the slip such that the motor generates a substantially constant voltage.

9. A system as claimed in claim 8, wherein the controller is also operable to deliver an output signal to the stator such that the motor is stepped from a low rotational speed to a high rotational speed.

10. A control system as claimed in claim 9, wherein the controller steps the motor from the low rotational speed to the high rotational speed in discrete increments.

11. A control system as claimed in claim 9, further comprising a starter switch coupled to the controller, and wherein the controller steps the motor from the low rotational speed to the high rotational speed after the starter switch is engaged.

12. A control system as claimed in claim 8, further comprising an ignition system coupled to the controller, and wherein the controller is operable to generate an ignition signal based on the signal of the sensor.

13. A control system for a motor having a stator and a rotor, the system comprising:
    a sensor generating a signal based on the speed of the rotor; and
    a controller coupled to the sensor and operable to deliver an output signal to the stator when the speed of the rotor is below a predetermined speed such that the motor is stepped from a low speed to a high speed, the high speed being less than or equal to the predetermined speed, and to deliver another output signal when the speed of the rotor is equal to or above the predetermined speed such that the motor is commutated at a speed that is less than the speed of the rotor to generate a slip.

14. A control system as claimed in claim 13, wherein the controller commutates the motor to vary the slip such that the motor generates a substantially constant voltage.

15. A control system as claimed in claim 13, wherein the controller steps the motor from the low speed to the high speed in 100 revolutions per minute increments.

16. A control system as claimed in claim 13, further comprising a starter switch coupled to the controller, and wherein the controller steps the motor from the low speed to the high speed after the starter switch is engaged.

17. A control system as claimed in claim 13, further comprising an ignition system coupled to the controller and wherein the controller is operable to generate an ignition signal based on the signal of the sensor.

18. A control system as claimed in claim 13, wherein the slip speed is controlled in a manner to produce a substantially constant output voltage.

19. A method of controlling a motor for an internal combustion engine, the motor having a stator, a rotor magnetically interacting with the stator, and a starter switch, the method comprising sensing the rotational speed of the rotor;

sensing engagement of the starter switch;

delivering an output signal to the stator to step the starter motor from a low rotational speed to a high rotational speed after the starter switch is engaged;

sensing starting of the internal combustion engine; and commutating the motor after the internal combustion engine is started and, when the rotational speed of the rotor is equal to or above a predetermined rotational speed, commutating the motor such that the motor is commutated at a rotational speed that is less than the rotational speed of the rotor.

20. A method as claimed in claim 19, wherein the sensing starting step includes sensing a current flow from the motor to a power source.

21. A method as claimed in claim 19, wherein the sensing starting step includes determining whether the sensed rotational speed of the rotor is greater than a rotational speed indicative of starting.

22. A method as claimed in 21, wherein the rotational speed indicative of starting is distinct for each step rotational speed.

23. A method as claimed in claim 19, wherein the commutating step includes establishing a desired output voltage for the motor.

24. A method as claimed in claim 23, wherein the commutating step further motor includes checking the actual output voltage of the motor.

25. A method as claimed in claim 24, wherein the commutating step further includes determining the difference between the desired output voltage and the actual output voltage.

26. A method as claimed in claim 25, wherein the commutating step further includes calculating a regulation adjustment based at least in part on the difference between the desired output voltage and the actual output voltage.

27. A method as claimed in claim 26, wherein the commutating step further includes estimating a future rotational speed of the rotor.

28. A method as claimed in claim 27, wherein the commutating step further includes calculating a new commutating speed by subtracting the estimated future rotational speed by the regulation adjustment.

29. A method of controlling a starter motor for an internal combustion engine, the starter motor having a stator and an integral flywheel rotor magnetically interacting with the stator, the method comprising sensing starting of the internal combustion engine; and commutating the starter motor after the internal combustion engine is started and, when the speed of the rotor is equal to or above a predetermined speed, commutating the starter motor such that the starter motor is commutated at a speed that is less than the speed of the rotor.

30. A method as claimed in claim 29, wherein the commutating step includes:

establishing a desired output voltage for the starter motor;

checking the actual output voltage of the starter motor;

calculating a commutation frequency based at least in part on the difference between the desired output voltage for the starter motor and the actual output voltage of the starter motor; and delivering a current with the commutation frequency to the stator.

31. A method as claimed in claim 30, wherein the calculating includes estimating a future speed of the rotor.

* * * * *